(Model.)
W. MUSTART.
FRUIT PICKER AND TREE TRIMMER.
No. 252,129.  Patented Jan. 10, 1882.
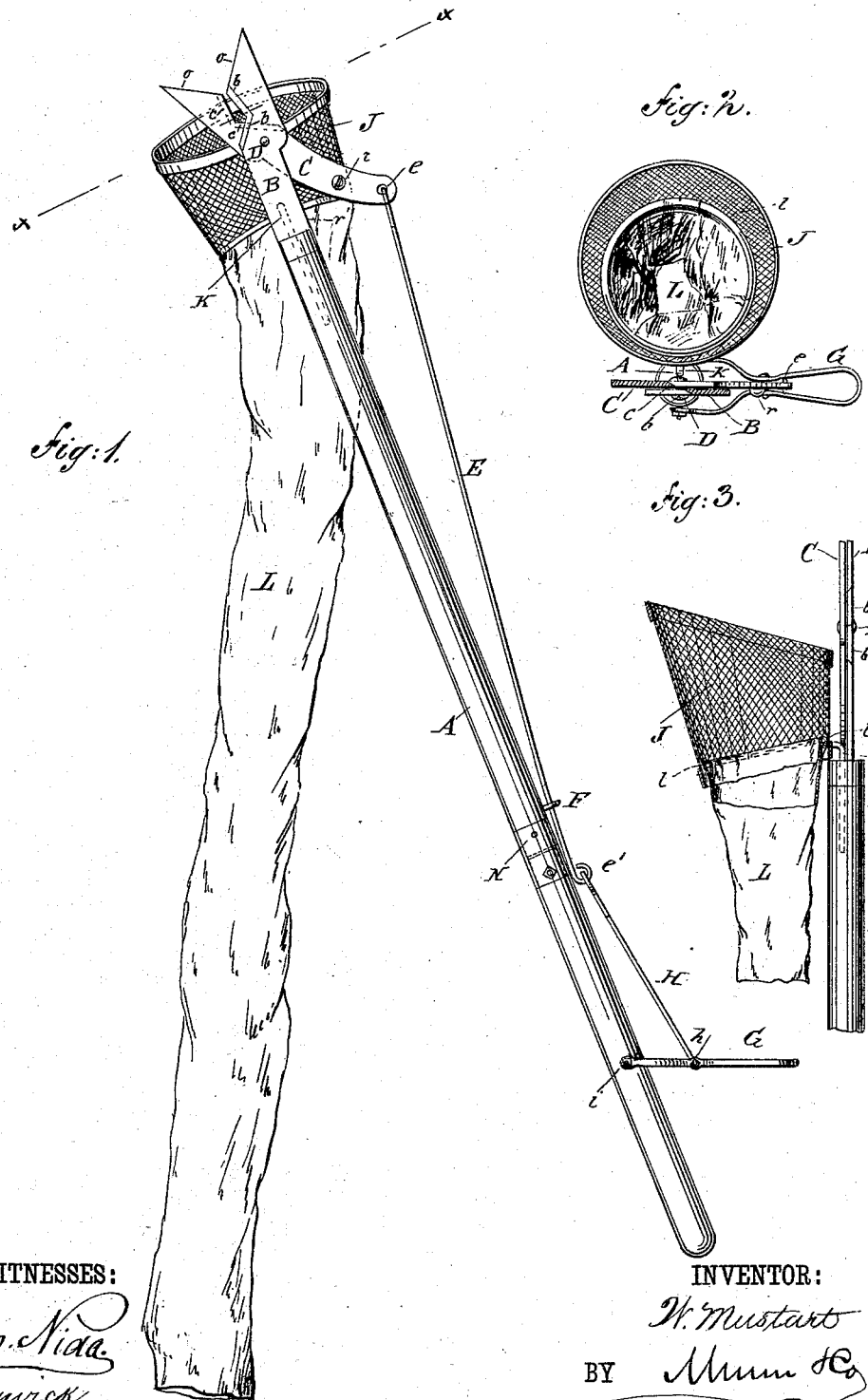
WITNESSES:
Chas. Nida
C. Sedgwick
INVENTOR:
W. Mustart
BY Munn & Co
ATTORNEYS.

UNITED STATES PATENT OFFICE.

WILLIAM MUSTART, OF JACKSONVILLE, FLORIDA.

FRUIT-PICKER AND TREE-TRIMMER.

SPECIFICATION forming part of Letters Patent No. 252,129, dated January 10, 1882.

Application filed April 23, 1881. (Model.)

*To all whom it may concern:*

Be it known that I, WILLIAM MUSTART, of Jacksonville, in the county of Duval and State of Florida, have invented new and useful Improvements in Fruit-Pickers and Tree-Trimmers, of which the following is a specification.

Figure 1 is an elevation of my implement. Fig. 2 is a sectional plan of the same, the section being on the line $x\ x$, Fig. 1. Fig. 3 is an elevation of the upper end of my implement at right angles with Fig. 1.

Similar letters of reference indicate corresponding parts.

The object of my invention is to provide an improved implement for picking fruits and trimming trees.

I more particularly describe my invention as follows:

In the accompanying drawings, A represents a rod, to which the implement is attached. At the upper end of rod A the jaw B, having two angular cutting-edges, $b\ b$, is rigidly secured. The coacting cutting-jaw C, also having two angular cutting-edges, $c\ c$, is pivoted to the jaw B at D.

To the movable jaw C the operating wire or rod E is attached at $e$. Said rod E may be guided in suitable bearings, F, attached to the rod A, which latter may be made in sections joined by ferrules, as at N, to admit of its being shortened or lengthened to adapt the implement for action on trees of varying height.

When a rod, A, of fixed length is to be used the hand-lever G may be fulcrumed therein, as at $i$, and a link, H, connects with said lever at $h$ and with the rod E at $e'$. An additional leverage over that afforded by the unequal length of the cutting-jaw C at each side of the pivot D is thus secured.

The cutting-edges $b$ and $c$ of the jaws B and C are of angular form, as shown, and when they are closing upon the fruit-stem to cut it said stem is forced to the vertex of the angle of their four cutting-edges and cannot slip from them, and the said four edges act together to easily sever the stem on the downward movement of the rod E. As will appear in the drawings, the upper ends of the jaws B and C are beveled downward and inward, as at $o$, so that when the implement is forced against a branch or stem within the angle formed by the edges $o$ the jaws B C will be opened to admit the stem between the cutting-edges $b$ and $c$ to sever it, as above described. The stop $r$, fixed to the jaw C, acts at $r'$ against the jaw B to limit the closing movement of the jaws and insure the proper angle of inclination of the edges $o$ to open said jaws B and C, as above set forth.

The fruit-receptacle J is funnel-shaped, and is removably connected to the rod A by a hook-shaped pin or rod, K, which is rigidly fixed to the receptacle, while its shank fits into an aperture in the top of the rod A. Said receptacle J carries the fruit-conveyer L, which consists of a tube made of cloth or other suitable fabric, its upper end being retained within the receptacle J by means of the wire ring $l$, which fits the interior lower face of the receptacle, said wire ring $l$ being secured to the upper end of the conveyer L by sewing or in any other suitable manner. Upon the severing of the fruit-stem by the cutting-jaws B C the fruit will fall into the receptacle J, and from thence down the conveyer L to the hand of the operator, in an unbruised and marketable condition.

When it is desired to use my implement as a tree trimmer or pruner, the receptacle J, carrying the conveyer L, may be quickly removed from the rod A.

My improved implement is thus adapted to the picking of oranges, apples, peaches, or other fruits without damage to the trees, and may be readily adjusted to act as a tree pruner or trimmer.

In defining my invention more clearly I would state that I am aware that the several features of my invention are not new in themselves, separately considered, and I therefore only claim the combination of the same which makes a more efficient, convenient, and better implement, and one capable of a more extended range of use.

Having thus fully described my invention, I claim as new and desire to secure by Letters Patent—

A fruit-picker constructed substantially as herein shown and described, and consisting of a pole or rod, A, carrying a fixed jaw, B, movable jaw C, pivoted to the fixed jaw, said jaws B and C having two angular cutting-edges, $b\ b$ and $c\ c$, to sever the stem, and inclined edges $o\ o$ to open the jaws, a fruit-receptacle, J, and conduit L, the whole combined and arranged for joint operation as set forth.

WILLIAM MUSTART.

Witnesses:
T. E. BUCKMAN,
E. H. BUCKMAN.